April 20, 1965 J. K. MIDDAUGH 3,179,931
ALARM TRANSFER SYSTEM
Filed Nov. 18, 1960 2 Sheets-Sheet 1

FIG. I

INVENTOR
J. K. MIDDAUGH
BY Donald M. Duft
ATTORNEY

United States Patent Office 3,179,931
Patented Apr. 20, 1965

3,179,931
ALARM TRANSFER SYSTEM
Jack K. Middaugh, Metuchen, N.J., assignor to American Telephone and Telegraph Company, New York, N.Y., a corporation of New York
Filed Nov. 18, 1960, Ser. No. 70,192
24 Claims. (Cl. 340—324)

This invention relates to alarm systems and particularly relates to alarm equipment for multi-terminal communication systems. The invention more particularly relates to alarm equipment which stores at an unattended terminal discrete items of information received from various equipment units at the same terminal upon the occurrence of a trouble condition in one of the units and, which subsequently transfers each stored item of information to a discrete area on the face of a cathode ray tube at a maintenance center.

Many communication terminals are adapted to operate on an unattended basis either continuously or for extended periods of time, such as week-ends and evenings. During such periods, the operable condition of the equipment in these terminals is generally monitored by automatic test equipment to determine any abnormal conditions which may arise and adversely affect service. The test equipment provided at the present time in such terminals usually includes a trouble recorder which is associated with all major equipment units in that terminal and which functions automatically to make a detailed record of any troubles that occur therein. Equipment is also often used to transfer alarm information indicative of a class of trouble from the unattended terminal to a maintenance center where personnel are available to evaluate and to determine the nature and seriousness of the trouble condition. Although the alarm information transferred to the maintenance center indicates the general class of trouble condition, the trouble record made at the unattended terminal is usually the primary source of information which allows maintenance personnel to fully evaluate, diagnose, and clear the trouble condition.

A deficiency of such alarm transfer arrangements is that the transmitted information is not sufficiently specific to indicate to the personnel in the maintenance center either the precise equipment unit in trouble or the nature of the trouble condition at the unattended terminal. When trouble conditions of a serious nature arise at an unattended terminal it is a practice to immediately dispatch a technician thereto to repair the trouble. In many cases, these technicians are specially trained for the repair and the maintenance of a limited number of equipment units, such as power and signaling units, and it is, therefore, desirable that the alarm information transferred to the maintenance center be adequate to allow the selection of the technician best trained to repair the trouble. This alarm information is generally insufficient for all selections and much time is obviously wasted by dispatching to an unattended terminal a technician who is not best trained for the required repair. Even in cases where the proper technician is dispatched, valuable time is wasted upon his arrival at the unattended terminal because reference to and analysis of the trouble record must be made before the trouble can be located and repaired. Thus, it is preferable that complete alarm information be forwarded from unattended terminals to the maintenance center to apprise the personnel thereat of the precise equipment unit in trouble and the nature of the trouble condition therein in order to effect its speedy repair and the restoration of the equipment to service. This is accomplished in accordance with the alarm transfer system of this invention.

A general object of this invention is to simplify the maintenance of unattended terminals and particularly to effect the speedy repair of trouble conditions arising thereat.

The main object is to supply adequate information to personnel at a maintenance center to enable them to correctly evaluate and determine the precise equipment unit in trouble at an unattended terminal as well as the nature of the trouble condition therein and thereby minimize the time that the unit is out-of-service.

A particular object is to provide a reliable, simple and economical alarm transfer system which will transfer large quantities of alarm information from unattended terminals to a maintenance center.

Another object is to eliminate the need for the usual trouble recorder equipment at terminals which are continuously unattended.

According to this invention, an unattended terminal is equipped with a storage device having a plurality of storage stages, each of which is associated with an equipment unit in that terminal for storing information received therefrom upon the occurrence of a trouble condition. In the maintenance center, a cathode ray tube and associated circuits are employed for storing alarm information transferred from the unattended terminal. The cathode ray tube includes a storage surface having a plurality of discrete storage areas, each of which corresponds to one of the storage stages at the unattended terminal, and also includes an electron gun for directing an electron beam against each of the storage areas. An arrangement is also provided for reading information stored in each storage stage at the unattended terminal to transfer it to the maintenance center where it is used to modulate the cathode ray tube electron beam at each of the discrete storage areas to effect the storage of information thereat in accordance with the information read from the corresponding storage stage at the unattended terminal. The stored information on the cathode ray tube is then used to inform the personnel at the maintenance center of the equipment unit in trouble at the unattended terminal and the type of trouble therein.

An advantage of this invention is that considerable time is saved in the repair of troubles originating in unattended terminals. In addition, whenever such terminals are designed for continuous unattended operation, the usual trouble recorder equipment in those terminals may be replaced by the equipment of the present invention. Another salient advantage of this invention is its usefulness and facile adaptability to existing communication systems.

A feature of this invention is the provision of a plural stage device at an unattended terminal for storing in the stages therof discrete items of alarm information applied thereto from equipment units at the same terminal upon the occurrence of a trouble condition in one of the units, and equipment for transferring the stored information from each of the storage stages to discrete areas on the face of a cathode ray tube at a maintenance center.

A particular feature, which is included in the transferring equipment, is the circuitry provided at the unattended terminal and the maintenance center for reading the stored alarm information in the storage stages at the unattended terminal to control its transfer to the face of the cathode ray tube. This circuitry performs the reading process by generating first control signals at the control terminal in response to a trouble condition in one of the equipment units at the unattended terminal, sending them to the unattended terminal to interrogate each of the storage stages thereat, and then completes the reading process by sending second control signals to the center to indicate the alarm information stored in the storage stages.

Another feature is the provision in a plural terminal alarm transfer system of a plural stage storage circuit at a first terminal for storing alarm information pertaining to equipment units at the same terminal upon the occurrence of a trouble condition in one of the units, together with apparatus for serially transferring the stored information from the first terminal to a second terminal where it is applied to a cathode ray tube which then indicates the operable condition of all equipment units at the first terminal. The cathode ray tube includes on its face a plurality of discrete storage areas, each of which corresponds to one of the storage stages at the first terminal. Circuitry is also provided at the second terminal to direct the cathode ray tube electron beam to each of the storage areas, and to modulate, in accordance with the transferred alarm information from the first terminal storage stages, the electron beam as it strikes each storage area to effect the storage of transferred alarm information thereat. In addition, circuitry is provided at the first and second terminals for synchronizing the cathode ray tube electron beam direction with the beam modulation to have the beam directed to each storage area at the time it is modulated in accordance with alarm information transferred from the corresponding storage stage at the first terminal.

The foregoing objects, advantages, and features of this invention, as well as others, will be apparent from the subsequent description of the exemplary embodiment thereof shown in the drawings.

A clear and complete understanding of the invention is facilitated by considering the system embodying the invention as represented in the two figures of the drawings. The invention is not, however, to be considered in any way limited in its application to the particular system illustrated in the drawings for it is generally applicable to any system in which information is to be transferred between two points. In addition, the quantity of alarm information transferred between the unattended terminals and the maintenance center by means of this illustrative embodiment is not to be considered as a limitation on the actual capacity of the system.

In the accompanying drawings:

FIG. 1 illustrates in block and schematic diagrams the equipment for one unattended telephone office. The equipment for each of the other unattended offices in the telephone system is essentially the same as that shown in FIG. 1. As shown, each such office comprises equipment units associated with a shift register circuit and with apparatus for controlling the write-in and read-out of information into the register circuit. It also shows signaling equipment comprising a modulator, resistance hybrid, line composite circuit, receiving pulse amplifier and a trunk to the maintenance center; and FIG. 2 depicts in block and schematic diagrams the maintenance center equipment. It shows an incoming trunk from each of the unattended offices designated 1–n associated with signaling equipment. The latter equipment includes a line composite circuit, relay lockout circuit, and resistance hybrid for each of the incoming trunks. All of the signaling equipments are associated at the maintenance center with a single demodulator circuit. FIG. 2 also shows control equipment including a pulse generator, gates, a flip-flop, and amplifier circuits associated with the signaling equipment and the demodulator circuit. It also shows a cathode ray tube and its associated circuits connected with the aforementioned control equipment.

Although the symbolic representations of circuit units in the drawings are well understood in the art, a brief description of certain units is presented for the purpose of clarity. The symbols that are not described are appropriately identified in the drawings. The closed crescents with leads terminated at the periphery represent "and" gate circuits. Closed crescents with leads extending into the crescents represent "or" gate circuits. Triangles are used to represent pulse amplifiers. Squares divided into four sections labelled S, R, A, and B represent bistable flip-flop circuits with set and reset inputs and A and B outputs, respectively. Relay contacts are shown in detached form in the drawings with "x" indicating a make contact and a vertical bar a break contact.

Various circuit units are shown in block diagram form in the drawings because each one is well known in the art. For example, the "and" and "or" gate circuits SG and MG, respectively, may be constructed of semiconductor or vacuum tube devices and may be similar to the circuits disclosed in the text "Reference Data for Radio Engineers," chapter 30, pages 886 and 887, the fourth edition printed by American Book, Stratford Press, Inc., New York. For this reason, a description of the various circuit units will be of a general nature and only those details thereof which are necessary for a clear and complete understanding of the instant invention will be presented.

Information is often encoded in digital form to obtain maximum speed and accuracy in the operation of communications systems. The binary form is a basic digital form used to encode numbers and other classes of data. It consists of two digits, zero and one, and is well suited to work with the apparatus of this system which is inherently binary or operates best in a binary mode. Binary modes of operation used herein are, for example, detecting the difference of two D.C. voltages, the operated or non-operated condition of a relay, and the presence or absence of a stored charge on the inner surface of a cathode ray tube. To denote the binary states of input and output signals for the various circuit units, a binary 0 is represented by a negative potential and a low frequency carrier signal, and a binary 1 is represented by a ground potential and a high frequency carrier signal.

Figure 1:
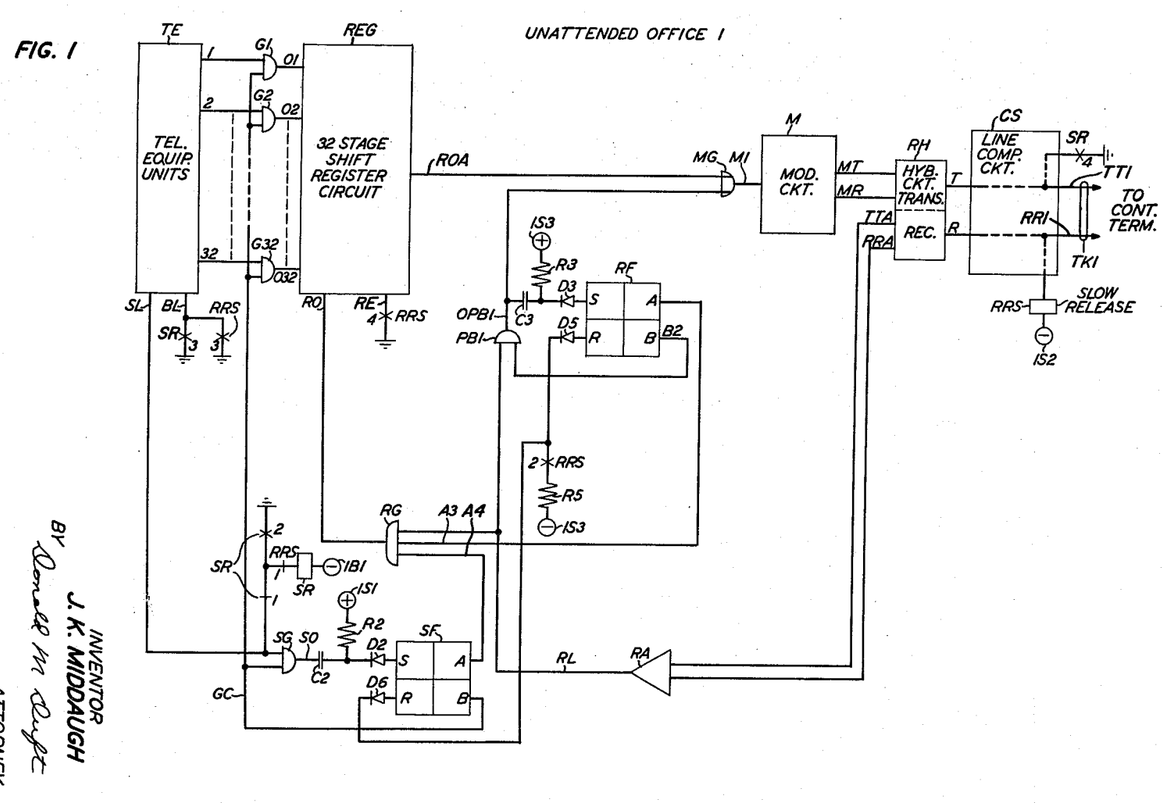
Figure 2:
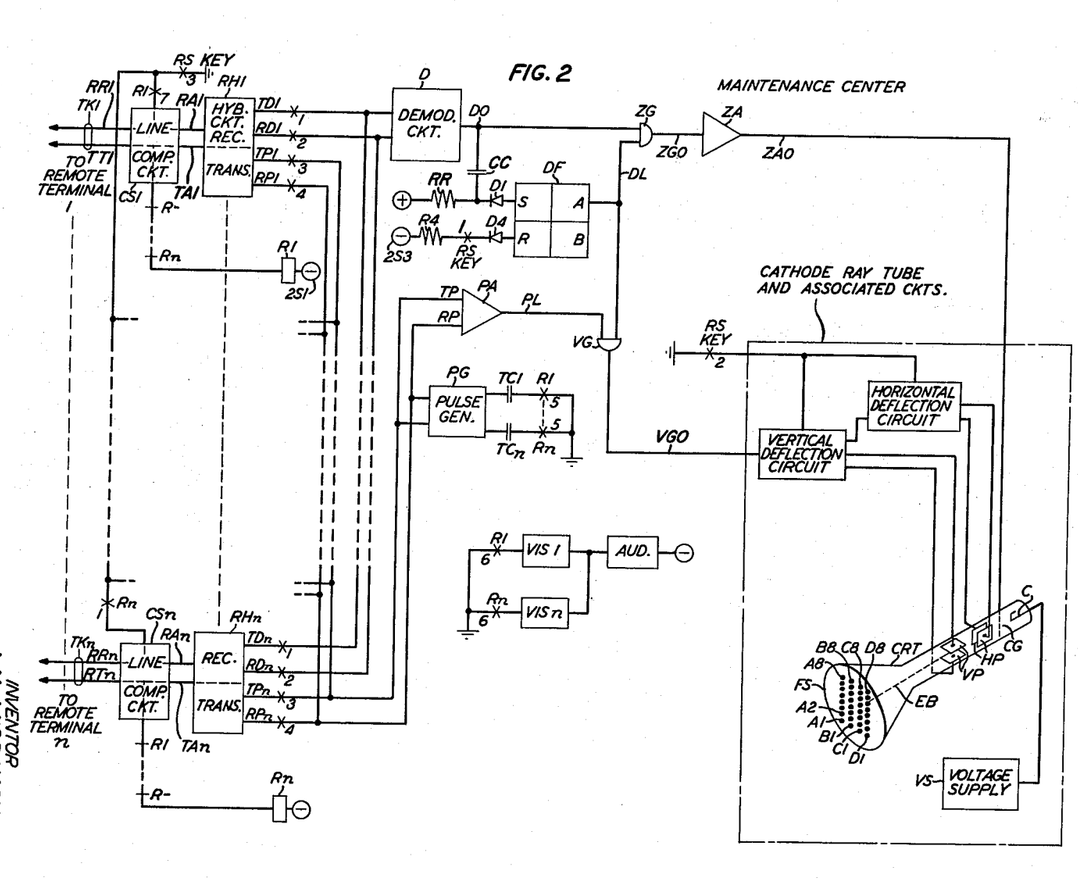

Reference is now made to FIG. 1 wherein there is illustrated unattended office equipment for effecting the transfer of binary-encoded information from the telephone equipment units TE over the trunk TK1 to the maintenance center equipment of FIG. 2. To simplify the following description, it is initially assumed that all equipments are not operated to effect the transfer of information. The equipment units TE are connected to the gates G1, G2, . . . G32, and SG and they pass to the gates binary 0 and 1 signals represented by negative and ground potentials, respectively. Negative potential is connected to leads 1, 2, . . . 32, and SL during the period that no information is being transferred to to inhibit gates G1, G2, . . . G32, and SG and to cause the potential on the gate input leads O1, O2, . . . O32, and SO to rest at negative potential. The gate control lead GC associated with gates G1, G2, . . . G32, and SG during the same period is resting at ground potential under control of the output B of the start flip-flop SF.

Flip-flop SF and each of the other flip-flops used in FIGS. 1 and 2 have two stable conditions; either operated or non-operated. Each one also has two inputs, set and reset; and two outputs A and B. When a flip-flop is in its normal condition, it is non-operated and the potential conditions at its two outputs are assumed to be: Ground potential at output B and negative potential at output A. When it is operated, these conditions are reversed with ground potential at output A and negative potential at output B. A flip-flop is operated by the application of a negative potential to its set input and, after it is operated, is reset to its unoperated state by the application of a negative potential to its reset input.

Associated with gates G1, G2, . . . G32 over the leads O1, O2, . . . O32 is the shift register circuit REG of FIG. 1 which has 32 storage stages (not shown). Each of these leads is connected to an individual stage (not shown) of the register which is used to store binary data passed from the units TE. These stages operate in a binary mode and produce negative and ground potential output signals in response to like input signals on leads O1, O2, . . . O32 for indicating binary 0 and 1 signals. The register is arranged for the parallel write-in and the serial read-out of data. It has provision for shifting data indefinitely in ring form from less significant to more significant storage stages, such as from stage 2 to stage 1, and for reading-out data on a non-destructive basis. Ground pulses are sequentially applied to the register read-out lead RO under control of the gates PB1 and RG and flip-flop RF of FIG. 1, in a manner explained hereinafter, to interrogate the register stages by shifting stored data from stage to stage, while at the same time, reading-out the data as it passes stage 1 (not shown) of the register and coupling it over the register output lead ROA through the gate MG and lead M1 to the modulator circuit M of FIG. 1. For resetting the register stages to the binary 0 state at the end of a read-out operation, ground is applied to the register reset lead RE through contact 4 of relay RRS. During the reset or idle period, all thirty-two register stages are reset and negative potential is connected to leads O1, O2, ... O32 and lead ROA resets at negative potential to indicate a binary 0.

Modulator circuit M of FIG. 1 is used to convert D.C. pulses into carrier frequency signals on a frequency shift basis. It produces continuous output carrier signals at a frequency $f_1$ in response to negative potential on the input lead M1 and, in response to ground potential on lead M1, shifts the carrier signals to a higher frequency $Cf_1$, where C is greater than 1. Output carrier signals from modulator M are coupled over leads MT and MR to the transmit side of the resistance hybrid circuit RH. The latter circuit has the function of providing a transition from a four-wire to a two-wire path and vice versa for carrying carrier frequency and pulse signals between the modulator M and regenerative pulse amplifier RA of FIG. 1 and the line composite circuit CS of FIG. 1. From hybrid RH, the carrier signals pass over the leads T and R through the line composite circuit CS and leads TT1 and RR1 of trunk TK1 of the maintenance center. The line composite circuit CS, in addition to providing a two-wire circuit between hybrid RH and trunk TK1, permits a D.C. signaling circuit to be derived from each of the two wires of trunk TK1 to the maintenance center. As is hereinafter described, the D.C. signaling circuit extending over lead TT1 of trunk TK1 is used to start the operation of the maintenance center equipment when data is to be transferred thereto from the unattended office 1, and the D.C. circuit extending over lead RR1 of trunk TK1 is used for resetting the unattended office equipment after data has been transferred and recorded in the maintenance center.

When information is not being transferred to the control terminal from any of the unattended offices 1–n, carrier signals at a frequency $f_1$ are coupled from the trunks TK1–n of Fig. 2 through the associated line composite circuits CS1–n of FIG. 2, leads RA1–n and TA1–n, and the resistance hybrid circuits RH1–n of FIG. 2 to the leads TD1–n and RD1–n connected to the receive sides of the hybrids RH1–n. At this time, however, leads TD1–n and RD1–n, as well as leads TP1–n and RP1–n, of the four-wire circuit extending between hybrids RH1–n and the demodulator D of FIG. 2 and pulse generator PG of FIG. 2 are opened by contacts 1, 2, 3 and 4 of the relays R1–n to prevent the passage of input carrier signals to demodulator D and the application of pulses to the transmit sides of hybrids RH1–n from generator PG.

Demodulator circuit D of FIG. 2 is employed to convert the in-band carrier frequency signals coupled from hybrids RH1–n into D.C. pulses. In response to an input carrier signal at a frequency $f_1$, demodulator D supplies an output negative potential to the demodulator output lead DO; and an output ground potential to lead DO in response to an input carrier signal at a frequency $Cf_1$. During the period that no input carrier signals are applied to demodulator D, the latter circuit connects negative potential to lead DO. This potential is applied to the differentiating network of FIG. 2 comprising capacitor CC and resistor RR to charge capacitor CC through resistor RR. Capacitor CC then maintains this charge until the potential on lead DO is changed. The negative potential on lead DO is also extended to the Z axis gate ZG of FIG. 2 whereat it cooperates with the negative potential passed to gate ZG over the lead DL from the output A of the demodulator flip-flop DF of FIG. 2 to cause the gate output lead ZGO to the Z axis amplifier ZA to rest at negative potential. The amplifier ZA is a non-inverting amplifier device which amplifies the negative potential on lead ZGO and passes the amplified potential to the control grid CG of the cathode ray tube CRT of FIG. 2 to keep the tube electron beam emited from cathode C at a low intensity until ground pulses are passed from the demodulator D to the amplifier ZA. As is hereinafter related, demodulator D converts into ground pulses the carrier signals of a frequency $Cf_1$ coupled thereto from the receive side of one of the hybrids RH1–n during the transfer of data from a remote terminal, and passes them via gate ZG to the amplifier ZA to change the CG control grid to cathode C bias of tube CRT for intensity modulating its electron beam EB.

The primary source of pulses for the system is the pulse generator PG of FIG. 2 which generates a continuous train of square wave pulses at selectable rates of speed. These pulses are transmitted to an unattended office, as described hereinafter, to control the synchronization of the system, the interrogation of the shift register thereat, and the transfer of data to the control terminal. These pulses are also used for triggering the vertical and horizontal deflection circuits of FIG. 2 to position the CRT tube electron beam EB during the transfer of data. The frequency of the generated pulses is controlled by the timing capacitors TC1–n of FIG. 2. Each of the capacitors TC1–n is connectable into the pulse frequency controlling network (not shown) of generator PG through an associated contact 5 of the relays R1–n to adjust the PG generator operation to a preassigned frequency which permits data to be transferred from remote terminals to the control terminal at high speeds. The maximum allowable pulse generating rate for generator PG in transferring data from a particular remote terminal is limited by the total time delay encountered in transmitting pulses over a trunk to the remote terminal to interrogate the shift register circuit thereat and in transmitting carrier frequency signals to the control terminal to effect the display of data on the screen FS of tube CRT. This time delay is determined mainly by the following factors: the characteristics of the trunk between the remote and control terminals, that is, its length, gauge, etc.; the speed of pulse propagation over the trunk to the remote terminal; the operational speed of the circuitry at the remote and control terminals; and the propagation speed of carrier frequency signals over the trunk to the control terminal. The capacitors TC1–n are selected for setting the generated pulse frequency at the highest allowable rate in accordance with the foregoing factors. For example, if the determining factors indicate that a maximum total time delay of four milliseconds will be encountered, the highest allowable pulse repetition rate for generator PG is 250 pulses per second (a pulse every four milliseconds). During the period that data is not being transferred to the control terminals, the pulses generated by generator PG are not transmitted to the remote terminals because, as mentioned previously, leads TP1–n and RP1–n are disconnected from leads TP and RP under control of relays R1–n and, in addition, they are prevented from triggering the vertical and horizontal deflection circuits, after they are used by amplifier PA to convert the potential on lead PL from negative to ground, by the pulse blocking gate VG of FIG. 2 which is inhibited by negative potential from output A of flip-flop DF.

Cathode ray tube CRT and the associated control system of FIG. 2 with which the invention is intended to function, by way of example, is disclosed in U.S. Patent 2,709,770, issued May 31, 1955, to S. Hansen. The circuits of this system are shown in block diagram form in FIG. 2 to simplify the drawings and to facilitate the understanding of the present invention. For a more complete description than is given herein of the construction of these circuits and of their mode of operation, reference may be made to the aforesaid Hansen patent. Tube CRT is of any well known electrostatic design and contains a cathode C for emitting the electron beam EB, a control grid CG for switching the intensity of beam EB low and high, and vertical and horizontal deflection plates VP and HP for deflecting beam EB to the desired coordinates on the fluorescent screen FS. The cathode C and other electrodes (not shown) of tube CRT are connected in an operative arrangement with the voltage supply VS of FIG. 2 in the well-known manner for controlling the emission of beam EB and its projection on screen FS. The grid CG of tube CRT is connected to amplifier ZA of FIG. 2 which controls the grid bias for intensity modulating beam EB. The screen FS is coated with a high persistency fluorescent material and is divided for the purpose of this exemplary embodiment into thirty-two discrete areas in 8 x 4 spot rectangular array illustrated in FIG. 2. These areas correspond respectively, to the individual stages of the shift register at a remote terminal. The beam positioning circuitry comprises the vertical and horizontal deflection circuits of FIG. 2 wherein, in response to successive ground pulses on lead VGO, incremental step potentials are generated across resistance ladder networks (not shown) by serially connected vertical and horizontal binary counter flip-flops (not shown) and are then applied to associated summing amplifier circuits (not shown) where they are added thereby developing an accurate deflection potential for application to the deflection plates VP and HP. As is explained hereinafter, prior to the interrogation of a register stage at an unattended office, step potentials are applied to the vertical and horizontal deflection plates VP and HP from the vertical and horizontal deflection circuits to deflect the beam EB to the area in the rectangular array corresponding to the register stage to be interrogated. Subsequently, the register stage is interrogated and tube CRT receives signals to intensity modulate the beam EB in accordance with the binary information stored in the interrogated register stage. These beam modulating signals are applied to the control grid CG of tube CRT after they are amplified by amplifier ZA.

Referring again to FIG. 1, the manner in which the system operates to receive alarm information from the units TE and to transfer it to the maintenance center will now be described. In the following description, it is assumed that units TE apply ground potentials to all of the leads 1, 2, . . . 32 to effect the storage of binary 1 signals in the associated stages of the shift register circuit. In practical applications, however, any combination of ground and negative potentials may be applied to these leads to signify the trouble information of the units TE. When ground potential is applied to leads 1, 2, . . . 32, it cooperates with the ground potential connected to the lead GC, as explained previously, from output B of flip-flop SF to enable gates G1, G2, . . . G32 to switch the potential on the leads O1, O2, . . . O32 from negative to ground and thereby to effect the storage of binary 1 signals in the associated register stages (not shown).

Meanwhile, the units TE also apply a momentary ground pulse to the start lead SL for operating the start relay SR and for immediately enabling the start gate SG to switch the potential on the output lead SO from negative to ground. Relay SR operates in the path extending from the ground on lead SL through contact 1 of relay SR, contact 1 of relay RRS, and the SR relay winding and, upon operating, simultaneously locks operated to the ground supplied to its operate winding through its own contact 2 and contact 1 of relay RRS and opens its operate path at its contact 1. Prior to the switching of the potential on lead SO from negative to ground, the negative potential thereon was applied to the differentiating network comprising capacitor C2 and resistor R2 to cause capacitor C2 to charge through resistor R2 to the potential difference between the negative potential on lead SO and the positive potential of source 1S1. This initial charging operates flip-flop SF; however, the flip-flop is reset, as hereinafter explained, to its unoperated condition before the system is placed into use. When the potential on lead SO switches to ground, capacitor C2 discharges slightly and produces a positive pulse at the junction of capacitor C2, resistor R2, and diode D2. This pulse, however, does not pass through the diode D2 for it is reversed biased. Shortly after the relay SR is locked operated, the ground pulse on lead SL is changed to negative potential to effect the switching of the potential on lead SO from ground to negative. This negative potential change is coupled from lead SO through capacitor C2 and diode D2 to the set input of flip-flop SF for operating the flip-flop and thereby reversing the potentials at its A and B outputs to ground and negative, respectively. At the same time, capacitor C2 recharges through resistor R2 to the potential change. The ground from output A of flip-flop SF is applied to lead A4 to partially enable the read-out gate RG and the negative potential from the B output is applied to lead GC to disable the gates G1, G2, . . . G32, and SG and, in turn, to switch the potentials on leads O1, O2, . . . O32 from ground to negative. The gates G1, G2, . . . G32 are disabled at this point to prevent extraneous pulses on the leads 1, 2, . . . 32 from changing the initial input information. The data stored in the shift register circuit remains unchanged after the switch to negative potential on leads O1, O2, . . . O32.

The operation of relay SR causes ground potential to be connected through its contact 3 to the busy lead BL for informing the units TE to release and for indicating the busy condition of the circuitry of FIG. 1. Units TE then release and switch the potential on leads 1, 2, . . . 32 from ground to negative. Units TE may then ready themselves for passing other information to the shift register circuit upon the occurrence of other trouble conditions at the unattended office subsequent to the transfer and recording of the presently stored data in the maintenance center.

Upon the operation of relay SR, ground potential is also applied through contact 4 of relay SR and the line composite circuits CS to lead TT1 of trunk TK1 to the maintenance center. At the maintenance center of FIG. 2, when information is not being transferred from any of the other unattended offices 2–n, the ground on lead TT1 passes through the line composite circuit CS1, break contacts of the intermediate relays R– (not shown) and of relay Rn, and the winding of relay R1 to negative potential source 2S1 to operate relay R1. On the other hand, if information is being transferred from one of the unattended offices 2–n, the operate circuit for relay R1 will be opened by the break contact of the relay R– associated with the transferring unattended office until the relay R– is released upon the completion of the information transfer. When the R1 relay operates, it opens the operate paths for all of the intermediate R-relays (not shown) and relay Rn to prevent the transfer of information from other unattended offices until the completion of the information transfer from office 1. The operation of relay R1 also closes its contacts 1, 2, 3 and 4 to connect the demodulator D and the pulse generator PG to the receive and transmit sides of the hybrid RH1. Contact 5 of relay R1 upon actuation connects capacitor TC1 into the pulse frequency controlling circuit of generator PG. The activation of the R1 relay contact 6 also closes a path for operating the audible and visual devices AUD and VISI of FIG. 2. The device AUD alerts personnel at the maintenance center of the transfer of information from an unattended office and the device VISI indicates the particular unattended office involved.

In the following description, it is assumed that the highest pulse generating frequency for generator PG during the transfer of information from unattended office 1 is limited to 250 pulses per second, a pulse every four milliseconds, by the total time delay encountered in the system. It is also assumed that the pulses to be transmitted over trunk TK1 are of such amplitude and shape as to introduce minimum interference with adjacent trunks. After the closure of contacts 3 and 4 of relay R1, pulses from generator PG are transmitted to unattended office 1 over a path extending from leads TP and RP through contacts 3 and 4 of relay R1, leads TP1 and RP1, transmit side of hybrid RH1, leads TA1 and RA1, and the line composite circuit CS1 to the leads TT1 and RR1 of trunk TK1. At unattended office 1, the pulses from trunk TK1 pass through the line composite circuit CS, leads T and R, receive side of hybrid RH, and the leads TTA and RRA to the regenerative pulse amplifier RA. The latter amplifier is a triggered device which supplies negative potential to lead RL during the idle period and which will generate one square wave ground pulse of three milliseconds duration on lead RL in response to a pulse of sufficient magnitude and duration on leads TTA and RRA. Any extraneous signals, such as pulse overshoot or ringing, which may be coupled to the amplifier RA locally or from trunk TK1 during the three millisecond pulse interval are not changed by amplifier RA into invalid ground pulses on lead RL. It is noted at this point that the output pulse duration generated by the corresponding regenerative pulse amplifiers at the other unattended offices 2–n (not shown) may be different from that of unattended office 1 for the pulse duration is determined by such factors as the operating frequency of generator PG for each unattended office and the allowable extraneous noise which is to be rejected.

Amplifier RA amplifies the pulses received every four milliseconds from generator PG of FIG. 2 and uses the first pulse to synchronize the operation of the unattended office 1 and the maintenance center circuits and all of the subsequent pulses for interrogating the shift register circuit. Hence, the first pulse is hereinafter referred to as a synchronizing pulse and all others are called interrogating pulses. The synchronizing pulse from amplifier RA is applied in parallel over lead RL to the gates RG and PB1. Gate RG is prevented from passing the pulse at this time because of the negative potential on lead A3. However, the ground pulse on lead RL cooperates with the ground potential on lead B2 to cause the potential on lead OPB1 to switch from negative to ground. Before describing the operations that occur at the time the potential on lead OPB1 is switched, it is desirable at this point to explain that when the negative potential is applied to lead OPB1, capacitor C3 is charged through resistor R3 to the potential difference between the potential on lead OPB1 and the potential of source 1S3. When the potential switch occurs on lead OPB1, it is applied in parallel to the differentiating network comprising capacitor C3 and resistor R3 to cause capacitor C3 to discharge slightly and produces a positive pulse which is applied to, but does not pass through, the reverse biased diode D3. The ground potential on lead OPB1 also enables gate MG to switch the potential on lead M1 from negative to ground and informs the modulator circuit M to shift its output carrier signal frequency from $f_1$ to $Cf_1$. The shifted signal is then passed from modulator M to the maintenance center over the leads MT and MR, transmit side of hybrid RH, leads T and R and composite circuit CS to the leads TT1 and RR1 of trunk TK1.

The received carrier signal at the maintenance center is passed from trunk TK1 through composite circuit CS1, leads TA1, RA1, receive side of hybrid RH1, leads TD1 and RD1 and contacts 1 and 2 of relay R1 to the demodulator circuit D which detects frequency shift and switches the potential on lead DO from negative to ground. This change in potential causes capacitor C1 to discharge slightly and causes gate ZG to be partially enabled; however, no further action occurs until the end of the three millisecond pulse interval.

Referring again to FIG. 1, when a potential on lead RL is again switched to negative at the end of the synchronizing pulse, gates PB1 and MG are inhibited and the potential on leads OPB1 and M1 is switched from ground to negative. As a result of the potential switch on lead OPB1, capacitor C3 recharges through resistor R3 and a negative pulse is passed through diode D3 to the set input of flip-flop RF to operate the flip-flop and switch the potential at its outputs A and B to ground and negative, respectively. The ground on lead A3 is then used to partially enable gate RG and the negative potential on lead B2 is used to disable gate PB1 to block further ground pulses from passing therethrough. Upon the switching of a potential on lead M1 from ground to negative, modulator M shifts its output carrier frequency from $Cf_1$ to $f_1$. The shifted carrier frequency signal is then sent over the previously described path to demodulator D at the maintenance center.

Demodulator D detects the frequency shift and changes the potential on lead DO from ground to negative. Capacitor CC recharges through resistor RR to the potential change and thereby causes a negative pulse to be passed through diode D1 to the set input of flip-flop DF to operate the flip-flop and switch potentials at its A and B outputs to ground and negative, respectively. The ground from output A is passed over lead DL to partially enable the gates VG and ZG of FIG. 2 for preparing them from passing control pulses to the vertical and horizontal deflection circuits and alarm information to the cathode ray tube CRT.

The second generated pulse from generator PG, which is the first interrogating pulse, is passed over leads TP and RP to the amplifier PA wherein it is used to convert the potential on lead PL from negative to ground and thereby to enable the gate VG in turn to switch the potential on lead VGO from negative to ground. As is similarly described in the previously identified Hansen patent, the first potential switch on lead VGO is differentiated and the negative portion of the differentiated pulse potential activates the vertical deflection circuit of FIG. 2 and causes it to apply a potential to the deflection plates VP for positioning the beam EB to area A1 of the 8 x 4 rectangular array illustrated on the screen FS of FIG. 2.

The first interrogating pulse from generator PG is also sent to the amplifier RA at unattended office 1 over the previously described path to cause amplifier RA to produce a second three millisecond ground pulse on lead RL. The latter pulse is applied to the gates PB1 and RG; however, at this time, gate PB1 is inhibited from passing the pulse to lead OPB1 by the negative potential on lead B2 and gate RG is enabled, by the ground potentials on leads A4 and A3, to switch the potential on lead RO from negative to ground and thereby to effect the interrogation of the first stage of the shift register circuit. As hereinbefore stated, each ground pulse applied to lead RO causes the information stored in the register to be shifted in ring form from stage to stage; hence, when successive pulses are applied to lead RO, the first, intermediate, and last stages will be successively interrogated. The interrogation will then be continuously repeated until all circuits are reset to normal as hereinafter explained. The first ground pulse applied to lead RO causes the shift register circuit to shift all stored alarm information in the thirty-two stages to the succeeding register stage and to produce a ground pulse of approximately three milliseconds duration on lead ROA since, as previously explained, information is stored in each stage of the register circuit. The ground on lead ROA enables the gate MG to switch the potential on lead M1 from negative to ground and thereby causes the modulator M to shift the frequency of its output carrier signal from $f_1$ to $Cf_1$ for approximately three milliseconds. The shifted carrier signal is then sent over the hereinbefore stated path to the demodulator D of FIG. 2.

Demodulator D detects the shift in the carrier frequency signal and switches the potential on lead DO from negative to ground. This potential switch causes capacitor CC to discharge slightly and causes, in combination with the ground potential on lead DL, gate ZG to be enabled to switch the potential on lead ZGO from negative to ground. Amplifier ZA amplifies the ground on lead ZGO and passes the amplified positive signal to the control grid CG of tube CRT to intensify the electron beam EB at area A1 to indicate the binary 1 which was stored in the first stage of the shift register circuit.

At the end of the three millisecond ground pulse on lead ROA of FIG. 1, the potential thereon switches to negative potential to inhibit gate MG and thereby change the potential on lead M1 from ground to negative. In response to the negative potential on lead M1, modulator M shifts its output carrier signal frequency from $Cf_1$ to $f_1$. This carrier signal is then sent over the hereinbefore described path to the demodulator D at the maintenance center which detects the frequency shift and changes the potential on lead DO from ground to negative for recharging capacitor CC, as previously explained, and for disabling gate ZG. Upon the disablement of gate ZG, the potential on lead ZGO is switched from ground to negative and amplifier ZA reflects this change by passing a corresponding negative potential to the control grid CG of tube CRT to reduce the EB electron beam intensity directed to area A1 of screen FS. The spectral decay time of the screen light, however, as mentioned previously, is very long so that the decrease in the beam intensity does not immediately change the spot intensity at area A1.

The second and successive interrogating pulses generated by generator PG are used for synchronously controlling the sequential deflection of the electron beam EB to the areas A2 through A8, B1 through B8, C1 through C8, and D1 through D8, and the sequential interrogation of the shift register stages 2 through 32 in a manner similar to that described for deflecting the beam EB to area A1 and for interrogating shift register stage 1. To review briefly the functions of these pulses, the second interrogating pulse will be traced through the unattended office 1 and the maintenance center. This second pulse is passed from generator PG over leads TP and RP to amplifier PA to convert the potential on lead PL from negative to ground and, in turn, for enabling gate VG to switch the potential on lead VGO from negative to ground. The second potential switch on lead VGO, as described in the aforesaid Hansen patent, activates the vertical deflection circuit of FIG. 2 and causes it to apply potential to the deflection plates VP for positioning the beam EB to area A2 on the screen FS. As previously mentioned, the intensity of beam EB is low at the time of switching the beam EB from coordinates A1 and A2; hence, no light trace line appears on the screen FS between the coordinates. The second interrogating pulse is also sent over the previously described path to amplifier RA to cause the latter amplifier to produce a third three millisecond ground pulse on lead RL. This pulse enables gate RG to switch the potential on lead RO from negative to ground and thereby effects the interrogation of the second stage of the shift register. Since the information initially stored in the second register stage was shifted forward to the first register stage by the first interrogating ground pulse on lead RO, the second ground pulse on lead RO causes all of the stored information to be again shifted to the next succeeding stage and causes a ground pulse of approximately three milliseconds duration to be produced on lead ROA to enable gate MG to switch the potential on lead M1 from negative to ground and thereby cause modulator M to shift the frequency of its output carrier signal from $f_1$ to $Cf_1$. The shifted carrier frequency signal is then sent over the previously described path to demodulator D which detects the frequency shift and switches the potential on lead DO from negative to ground to enable gate ZG to change the potential on lead ZGO from negative to ground. Amplifier ZA amplifies the ground potential on lead ZGO and passes the amplified potential to the control grid CG to intensify the electron beam EB directed to area A2 to indicate the binary 1 initially stored in the second stage of the shift register circuit. At the end of the three millisecond ground pulse on lead ROA, gate MG is inhibited and the potential on lead M1 is switched from ground to negative for causing a frequency shift from $Cf_1$ to $f_1$ in the carrier signal transmitted to demodulator D at the control terminal. Demodulator D then detects the frequency shift and switches the potential on lead DO from ground to negative for inhibiting gate ZG and causing the potential on lead ZGO to switch from ground to negative. In turn, amplifier ZA responds to the negative potential change on lead ZGO and passes a negative potential to the grid CG to reduce the intensity of the beam EB directed to area A2. This completes the cycle of transferring alarm information from the second register stage to the area A2 of screen FS. The circuit operations involved in transferring data from the other register stages to the appropriate areas on screen FS and for continuing same after the first complete transfer of information are similar to those just described.

After the rectangular array of alarm information is stored on the inner surface of the screen FS and light is emanating therefrom, a suitable permanent record thereof can be made automatically or on a manual basis by personnel at the maintenance center. A record can be made automatically, for example, by means (not shown) arranged for photographing the cathode ray tube display. The record can also be made automatically by a suitable teleprinter (not shown) arranged to print binary 0 and 1 characters in response to the pulses on lead VGO which indicate the stage interrogated at the unattended offices and the pulses on lead ZGO which indicate the binary 0 and 1 signals stored in the register stages. The maintenance personnel are able to evaluate the information record and to ascertain the precise equipment unit in trouble and the type of trouble therein at the unattended office. Thereafter, a qualified technician can be dispatched to the unattended office 1 with full knowledge of the repair problem.

As will be apparent to anyone skilled in the art, other electrostatic and electromagnetic cathode ray tube circuits, such as barrier grid storage tube and flying spot storage tube circuits, are also suitable for use with the present invention. The circuitry required for beam deflection and for storing and reading-out data in such storage tubes is well known in the art and, therefore, a discussion thereof is not deemed pertinent to this invention. However, in such application, it is imperative that the operational sequence of applying information signals for storage in such tubes and for reading-out stored information have a definite correlation therebetween.

Information is continuously transferred from the unattended office 1 to the maintenance center until key RS of FIG. 2 is momentarily operated to effect the reset of circuits at both the unattended office 1 and the maintenance center to the idle condition. The reset of the maintenance center circuits is initiated when the negative potential 2S3 is applied through resistor R4, contact 1 of key RS, and diode D4 to reset flip-flop DF to its unoperated condition and cause the potential from its output A on lead DL to switch from ground to negative for inhibiting the gates VG and ZG and thereby preventing further pulses from being applied to the vertical and horizontal deflection circuits and to amplifier ZA. The operation of key RS also connects ground potential through contact 2 of key RS for resetting all binary counter flip-flops (not shown) of the vertical and horizontal deflection circuits and consequently causing the electron beam EB to be deflected from an area in the rectangular array to a position off of the screen FS.

The reset of the unattended office 1 circuits is started when ground is connected at the maintenance center through contact 3 of key RS, contact 7 of the operated relay R1, line composite circuit CS1, lead RR1 of trunk TK1 to the remote terminal, line composite circuit CS, and the winding of remote reset relay RRS to negative potential 1S2 to operate relay RRS. The operation of relay RRS closes the negative potential 1S3 through resistor R5, contact 2 of relay RRS, and the diodes D5 and D6 in parallel to the reset inputs of the flip-flops RF and SF to reset these circuits to their unoperated condition and thereby reverse the potentials at their A and B outputs. Upon the operation of relay RRS, its contact 3 is actuated to connect ground to the lead BL for indicating the busy condition of the circuitry of FIG. 1 until the reset of the circuits of FIGS. 1 and 2 is completed. Contact 4 of relay RRS is actuated for connecting ground to the RE lead to the shift register circuit to reset all shift register stages to the binary 0 state. Contact 1 of relay RRS upon its actuation opens the path holding relay SR locked operated and causes the fast-acting relay SR to release and open at its contact 4 the operate path for the fast release relay R1 of FIG. 2. Thereupon, relay R1 releases and opens at its contacts 1, 2, 3 and 4 the connections between the hybrid RH1 and the demodulator D and pulse generator PG. Upon releasing, relay R1 opens the activating circuit for the audible and visual devices AUD and VISI at its contact 6 and also disconnects capacitor TC1 from the generator PG at its contact 5. The release action of relay R1 also closes its break contacts in the operate paths for the relays R (not shown) and thereby permits one of these relays to be operated when information is to be transferred from one of the associated unattended offices. It is recognized that when more than one of the R1 to Rn relays attempt to operate simultaneously a race condition is present. This condition may be eliminated by placing the operate path for these relays in a preference chain which permits only one relay to operate at a time.

Following the release of relay R1, the slow-release relay RRS is released by the opening of its operate circuit at contact 7 of relay R1 to effect the removal of negative potentials from the reset inputs of the flip-flops RF and SF and the removal of ground potentials from the lead RE to the shift register circuit and the busy lead BL to equipment units TE. The release of relay RRS also partially recloses at its contact 1 the operate path for relay SR. This completes the cycle of operation and returns the circuits to the idle state wherein no information is passed from the units TE to the alarm transfer system.

It is to be understood that the above-described arrangements are illustrative of the application of the principles of this invention. In light of this teaching, it is apparent that numerous other arrangements may be devised by those skilled in the art without departing from the spirit and scope of the invention. For example, the number of information storage areas of the cathode ray tube CRT of FIG. 2 can be increased indefinitely in accordance with techniques well known in the art, and likewise, the corresponding number of storage stages can be added to the shift register circuit of FIG. 1.

What is claimed is:

1. In an alarm transfer system having a first and a second terminal, a shift register circuit at said first terminal consisting of a plurality of storage devices and electrical means interconnecting successive devices for shifting information from device to device, a source for applying electrical signals representing information to each of said devices to effect the storage of said information therein, means at said terminals operative under control of said source to effect the shifting of said stored information from device to device, a cathode ray tube at said second terminal including a luminescent surface having a plurality of discrete areas each of which corresponds to one of said storage devices, means at said second terminal for projecting an electron beam against said surface, means at said second terminal responsive to the storage of information in said devices for successively deflecting said beam to each of said surface areas, means at said second terminal for modulating said beam, means associated with one of said storage devices for coupling all shifted information from said one device to said modulating means to effect the intensity modulation of said beam, and means at said terminals for synchronizing said beam deflection with said beam modulation to have said beam deflected to each of said areas at the time that the stored information of the corresponding storage devices is coupled from said one storage device to effect said beam modulation.

2. In an alarm transfer system having a first and a second terminal, a shift register circuit at said first terminal consisting of a plurality of storage devices and electrical means interconnecting successive devices for shifting information from device to device, equipment units at said first terminal, each of said units associated with one of said storage devices, means in each of said units responsive to a trouble condition in one of said units for applying electrical signals representing alarm information to said associated devices to effect the storage of said information therein, means at said second terminal responsive to a trouble condition in one of said units for generating a first and successive control signals, means for sending said signals to said first terminal, means at said first terminal responsive to said successive control signals for effecting the shift of said stored alarm information from device to device, a cathode ray tube at said second terminal including a luminescent surface having a plurality of discrete areas each of which corresponds to one of said storage devices, means at said second terminal for projecting an electron beam against said surface, means at said second terminal responsive to said successive control signals for successively deflecting said beam to each of said storage areas, means at said second terminal for intensity modulating said beam, means associated with one of said storage devices for coupling all shifted alarm information from said one device to said modulating means to effect the modulation of said beam, and means at said terminals responsive to said first control signal for synchronizing said beam deflection with said beam modulation to have said beam deflected to each of said areas at the time that the stored alarm information of the corresponding storage device is coupled from said one storage device to effect said beam modulation.

3. In an alarm transfer system having a first and a second terminal, a plural stage storage means at said first terminal, a source for applying electrical signals representing information to said storage means to effect the storage of said information in the stages thereof, means at said second terminal operative under control of said source for generating control pulses, a communication channel extending between said terminals, means for sending said pulses over said channel to said first terminal, means at said first terminal response to the received control pulses for effecting the reading of stored information from each of said stages, means for sending the read information over said channel to said second terminal, an electron discharge device at said second terminal including a storage surface having a plurality of discrete storage areas each of which corresponds to one of said storage stages, means at said second terminal for directing an electron beam to each of said storage areas, means at said second terminal responsive to the received read information for modulating said beam at each storage area, and synchronizing means activated by said control pulses for controlling said modulating means to effect the storage of information at each storage area in accordance with the information read from the corresponding stage of said storage means.

4. In an alarm transfer system having a first and a second terminal, a plural stage storage means at said first terminal, a source for applying electrical signals representing information to each of said storage stages to effect the storage of said information therein, means at said second terminal operative under control of said source for generating control pulses, a communication channel extending between said terminals, means for sending said pulses over said channel to said first terminal, means at said first terminal responsive to the received control pulses for effecting the serial reading of stored information from each of said stages, means for sending read information over said channel to said second terminal, an electron discharge device at said second terminal including a storage surface having a plurality of discrete storage areas each of which corresponds to one of said stages, means at said second terminal for projecting an electron beam against said surface, synchronizing means at said second terminal responsive to said control pulses for deflecting said beam to each of said storage areas at the time that said information is read from the corresponding stage of said storage means, and means at said second terminal responsive to the received read information for modulating said beam at each storage area to effect the storage of information thereat in accordance with the information read from the corresponding stage of said storage means.

5. In an alarm transfer system having a first and a second terminal, a plural stage storage means at said first terminal, a source for applying electrical signals representing information to each of said storage stages to effect the storage of said information therein, means at said second terminal operative under control of said source for generating a first and successive control signals, a communication channel extending between said terminals, means for sending said signals over said channel to said first terminal, means at said first terminal responsive to the received successive control signals for effecting the serial reading of stored information from each of said stages, means for sending read information over said channel to said second terminal, an electron discharge device at said second terminal including a storage surface having a plurality of discrete storage areas each of which corresponds to one of said stages, means at said second terminal for projecting an electron beam against said surface, means at said second terminal responsive to said successive control signals for successively deflecting said beam to each of said storage areas, means at said second terminal responsive to received read information for modulating said beam to effect the storage of information at each storage area, and means at said terminals responsive to said first control signal for synchronizing said beam deflection with said beam modulation to have said beam deflected to each storage area at the time that said beam is modulated by said received information read from the corresponding stage of said storage means.

6. In an alarm transfer system having a first and a second terminal, a plural stage storage means at said first terminal, a source for applying electrical signals representing information to each of said storage stages to effect the storage of said information therein, means at said second terminal operative under control of said source for generating a first and successive control signals, a communications channel extending between said terminals, means for sending said signals over said channel to said first terminal, means at said first terminal responsive to received successive control signals for effecting the serial reading of stored information from each of said stages, means for sending read information over said channel to said second terminal, an electron discharge device at said second terminal including a luminescent surface having a plurality of discrete areas each of which corresponds to one of said storage stages, means at said second terminal for projecting an electron beam against said surface, means at said second terminal responsive to said successive control signals for successively deflecting said beam to each of said surface areas, means at said second terminal responsive to received read information for intensity modulating said beam at each of said surface areas, and means at said terminals responsive to said first control signal for synchronizing said beam deflection with said beam modulation to have said beam deflected to each surface area at the time that said beam is modulated by the received information read from the corresponding stage of said storage means.

7. In an alarm transfer system having a first and a second terminal, a shift register circuit at said first terminal consisting of a plurality of storage devices and electrical means interconnecting successive elements for shifting information from device to device, a source for applying electrical signals representing information to each of said devices to effect the storage of said information therein, means at said second terminal operative under control of said source for generating a first and successive control signals, a communication channel extending between said terminals, means for sending said control signals over said channel to said first terminal, means at said first terminal responsive to the received successive control signals for effecting the shift of said stored information from device to device, means at said first terminal associated with one of said storage devices for coupling all shifted information from said device, means at said first terminal for sending all shifted information coupled from said one storage device to said second terminal, a cathode ray tube at said second terminal including a luminescent surface having a plurality of discrete areas each of which corresponds to one of said storage devices, means at said second terminal for projecting an electron beam against said surface, means at said second terminal responsive to said successive control signals for successively deflecting said beam to each of said surface areas, means at said second terminal responsive to received information from said first terminal for intensity modulating said beam at each of said surface areas, and means at said terminals responsive to said first control signal for synchronizing said beam deflection with said beam modulation to have said beam deflected to each surface area at the time that the received information from the corresponding storage device effects said beam modulation.

8. In an alarm transfer system having a first and a second terminal, a plural stage storage means at said first terminal, a source for applying electrical signals representing binary information to said storage means to effect the storage of said binary information in the stages thereof, means at said second terminal operative under control of said source for generating control pulses, a communication channel extending between said terminals, means for sending said pulses over said channel to said first terminal, means at said first terminal responsive to the received control pulses for effecting the serial reading of stored binary information from each of said stages, means for sending carrier frequency signals over said channel from said first to said second terminal, means at said first terminal for shifting the frequency of said carrier signals in accordance with the binary information read from said storage stages, an electron discharge device at said second terminal including a storage surface having a plurality of discrete storage areas each of which corresponds to one of said storage stages, means at said second terminal for directing an electron beam to each of said storage areas, and means at said second terminal responsive to frequency shifts of the received carrier signals for modulating said beam at each storage area to effect the storage of binary information thereat in accordance with the received binary information from the corresponding stage of said storage means.

9. In an alarm transfer system having a first and a second terminal, a plural stage storage means at said first terminal, a source for applying electrical signals representing binary information to each of said storage stages to effect the storage of said binary information therein, means at said second terminal operative under control of said source for generating control pulses, a communications channel extending between said terminals, means for sending said control pulses over said channel to said first terminal, means at said first terminal responsive to the received control pulses for effecting the serial reading of stored binary information from each of said stages, means for sending carrier frequency signals over said channel from said first to said second terminal, means at said first terminal for shifting the frequency of said carrier signals in accordance with the binary information read from said storage stages, an electron discharge device at said second terminal including a storage surface having a plurality of discrete storage areas each of which corresponds to one of said storage stages, means at said second terminal for projecting an electron beam against said surface, means at said second terminal responsive to said control pulses for deflecting said beam to each of said storage areas, and means at said second terminal responsive to frequency shifts in the received carrier signals for modulating said beam at each storage area to effect the storage of binary information thereat in accordance with the binary information from the corresponding stage of said storage means.

10. In an alarm transfer system having a first and a second terminal, a plural stage storage means at said first terminal, a source for applying electrical signals representing binary information to each of said storage stages to effect the storage of said binary information therein, means at said second terminal operative under control of said source for generating a first and successive control pulses, a communication channel extending between said terminals, means for sending said pulses over said channel to said first terminal, means at said first terminal responsive to the received successive control pulses for effecting the serial reading of stored binary information from each of said stages, means for sending carrier frequency signals over said channel from said first to said second terminal, means at said first terminal for shifting the frequency of said carrier signals in accordance with the binary information read from said stages, an electron discharge device at said second terminal including a storage surface having a plurality of discrete storage areas each of which corresponds to one of said storage stages, means at said second terminal for projecting an electron beam against said surface, means at said second terminal responsive to said successive control pulses for successively deflecting said beam to each of said storage areas, means at said second terminal responsive to frequency shifts in the received carrier signals for modulating said beam to effect the storage of binary information at each storage area, and means at said terminals responsive to said first control pulse for synchronizing said beam deflection with said beam modulation to have said beam deflected to each storage area at the time that said beam is modulated thereat in response to received carrier signals for the corresponding stage of said storage means.

11. In an alarm transfer system having a first and a second terminal, a plural stage storage means at said first terminal, a source for applying electrical signals representing binary information to each of said storage stages to effect the storage of said information therein, means at said second terminal operative under control of said source for generating a first and successive control pulses, a communication channel extending between said terminals, means for sending said pulses over said channel to said first terminal, means at said first terminal responsive to the received successive control pulses for effecting the serial reading of said stored information from each of said stages, means for sending carrier frequency signals over said channel from said first to said second terminal, means at said first terminal for shifting the frequency of said carrier signals in accordance with the stored information read from said stages, an electron discharge device at said second terminal including a luminescent surface having a plurality of discrete areas each of which corresponds to one of said storage stages, means at said second terminal for projecting an electron beam against said surface, means at said second terminal responsive to said successive control pulses for successively deflecting said beam to each of said surface areas, means at said second terminal responsive to frequency shifts in the received carrier signals for intensity modulating said beam at each of said surface areas, and means at said terminals responsive to said first control pulse for synchronizing said beam deflection with said beam modulation to have said beam deflected to each surface area at the time that said beam is modulated thereat in response to received carrier signals for the corresponding stage of said storage means.

12. In an alarm transfer system having a first and a second terminal, a shift register circuit at said first terminal consisting of a plurality of storage devices and electrical means interconnecting successive devices for shifting information from device to device, a source for applying electrical signals representing binary information to each of said devices to effect the storage of said information therein, means at said second terminal operative under control of said source for generating a first and successive control pulses, a communication channel extending between said terminals, means for sending said pulses over said channel to said first terminal, means at said first terminal responsive to the received successive control pulses for effecting the shift of said stored information from device to device, means at said first terminal associated with one of said storage devices for coupling all shifted information from said device, means for sending carrier frequency signals over said channel from said first to said second terminal, means at said first terminal for shifting the frequency of said carrier signals in accordance with all shifted information coupled from said one storage device, a cathode ray tube at said second terminal including a luminescent surface having a plurality of discrete areas each of which corresponds to one of said storage devices, means at said second terminal for projecting an electron beam against said surface, means at said second terminal responsive to said control pulses for successively deflecting said beam to each of said surface areas, means at said second terminal responsive to frequency shifts in the received carrier signals for intensity modulating said beam at each of said surface areas, and means at said terminals responsive to said first control pulse for synchronizing said beam deflection with said beam modulation to have said beam deflected to each surface area at the time that said beam is modulated thereat in response to received carrier signals for the corresponding device of said storage means.

13. In an alarm transfer system having an unattended office and a maintenance center, a plural stage storage means at said office, means for applying electrical signals representing information to said storage means to effect the storage of said information in the stages thereof, signaling means for communicating between said office and said center and having a two-conductor trunk connected therebetween, a line composite circuit at said office and said center associated with said trunk conductors, and a hybrid circuit at said office and said center associated with the composite circuit thereat, a relay circuit including one conductor of said trunk and said composite circuit at said office and said center operative under control of said signal applying means for indicating the storage of information in said storage stages, means at said center responsive to the operation of said relay circuit for generating control pulses, means for connecting said generating means to said hybrid circuit at said center to effect the transmission of said control pulses over said trunk to said office, means at said office responsive to the received control pulses for effecting the reading of stored information from said stages, means connected to said hybrid circuit at said office for effecting the transmission of carrier frequency signals over said trunk to said center, means at said office for shifting the frequency of said transmitted carrier signals in accordance with read information from said storage stages, an electron discharge device at said center including a storage surface having a plurality of discrete areas each of which corresponds to one of said storage stages, means at said center for directing an electron beam to each of said storage areas, and means at said center responsive to frequency shifts in the received carrier signals for modulating said beam at each storage area to effect the storage of information thereat in accordance with the information read of the corresponding stage of said storage means.

14. In an alarm transfer system having an unattended office and a maintenance center, a plural stage storage means at said office, equipment units at said office, each of said units associated with one of said storage stages, means in each of said units responsive to a trouble condition in one of said units for applying electrical signals representing alarm information to said associated storage stages to effect the storage of said information therein, signaling means for communicating between said office and said center and having a two-conductor trunk connected therebetween, a line composite circuit at said office and said center associated with said trunk conductors, and a hybrid circuit at said office and said center associated with the composite circuit thereat, a relay circuit including one conductor of said trunk and said composite circuit at said office and said center operative in response to a trouble condition in one of said units for indicating the storage of information in said storage stages, means at said center responsive to the operation of said relay circuit for generating control pulses, means for connecting said generating means to said hybrid circuit at said center to effect the transmission of said control pulses over said trunk to said office, means at said office responsive to the received control pulses for effecting the reading of stored information from said stages, means connected to said hybrid circuit at said office for effecting the transmission of carrier frequency signals over said trunk to said center, means at said office for shifting the frequency of said transmitted carrier signals in accordance with alarm information read from said storage stages, an electron discharge device at said center including a luminescent surface having a plurality of discrete areas, each of which corresponds to one of said storage devices at said office, means at said center for directing an electron beam against said surface, means at said center responsive to said control pulses for successively deflecting said beam to each of said surface areas, and means at said center responsive to frequency shifts in the received carrier signals for intensity modulating said beam at each surface area in accordance with the alarm information of the corresponding stage of said storage means to effect a light display of alarm information on said surface.

15. In an alarm transfer system having an unattended office and a maintenance center; a binary shift register circuit having a plurality of storage stages, means for coupling input binary information to each of said stages to effect the storage of said information therein, electrical means interconnecting in ring form the successive storage stages for shifting stored information from stage-to-stage of the register circuit in a step-by-step manner without destroying shifted information, and means associated with one of said storage stages for coupling all shifted binary information from said one stage; equipment units at said unattended office, means in each of said units responsive to a trouble conditon in one of said units for applying binary information to said input coupling means for effecting the storage of alarm information in said stages of said register circuit; signaling means for communicating between said office and said center and having a two-conductor trunk connected therebetween, a line composite circuit at said office and said center associated with said trunk conductors, and a hybrid circuit at said office and said center associated with the composite circuit thereat; a relay circuit including one conductor of said trunk and said composite circuit at said office and said center operative in response to a trouble condition in one of said units for indicating the storage alarm information in said storage stages; means at said center responsive to the operation of said relay circuit for generating a first and successive control pulses; means for connecting said generating means to said hybrid circuit at said center to effect the transmission of said control pulses over said trunk to said office; means at said office responsive to the received successive control pulses for effecting the shift of stored alarm information from stage-to-stage; means connected to said hybrid at said office for effecting the transmission of carrier frequency signals over said trunk to said center; means at said office for shifting the frequency of said transmitted carrier signals in response to said first control pulse and in accordance with shifted alarm information coupled from said one storage stage; a cathode ray tube at said center including a luminescent surface having a plurality of discrete areas each of which corresponds to one of said storage stages; means at said center for projecting an electron beam against said surface; means at said center responsive to said successive control pulses for successively deflecting said beam to each of said surface areas; means at said center responsive to frequency shifts in the received carrier signals for intensity modulating said beam at each of said surface areas; and means at said office and said center responsive to said first control pulse for synchronizing said beam deflection with said beam modulation to have said beam deflected to each surface area at the time said beam is modulated in response to received carrier signals for the corresponding storage stage of said shift register circuit.

16. An information transfer system comprising a plurality of offices, a register circuit at each of said offices having individual devices for storing information, a control center, a signaling circuit extending between each of said offices and said center, pulse generating means at said center, means for applying pulses from said generating means to said signaling circuits, means at said offices responsive to the receipt of said pulses for reading said information from said devices, means for transmitting read information over said signaling circuits to said center, storage means at said center having a plurality of storage areas each of which corresponds to one of said devices at each of said offices, synchronizing means responsive to said pulses for selectively activating each of said areas at the time that said information is read from said corresponding device at each of said offices, and means at said center for supplying a modulating signal to each of said activated areas to effect the storage of information thereat in accordance with the information received from the corresponding device at said offices.

17. An information transfer system according to claim 16 wherein each of said signaling circuits comprises a two-conductor trunk having a first termination at an office and a second termination at said center, and a pair of composite circuits each of which is connected to one of said terminations for providing an alternating-current signaling path and a first and a second direct-current signaling path over said trunk.

18. An information transfer system according to claim 17 further comprising means including apparatus at said center for applying a direct-current signal to said second signaling paths for transmission to said offices, and a relay at each of said offices responsive to said direct-current signal from said second path for resetting said register devices to erase the information stored therein.

19. An information transfer system according to claim 17 wherein each of said signaling circuits further comprises a pair of hybrid circuits each of which is connected to the alternating-current signaling path of one of said pair of composite circuits.

20. An information transfer system according to claim 19 wherein each of said hybrid circuits comprises a resistance hybrid having a first termination connected to said alternating-current signaling path of a composite circuit, a second termination for transmitting signals to said last-mentioned path, and a third termination for receiving signals from said last-mentioned path.

21. An information transfer system according to claim 20 wherein said applying means comprises a plurality of relay circuits each of which is connectable to said first signaling path of one of said signaling circuits and is operable for applying said pulses to said second hybrid termination of said one signaling circuit at said center.

22. An information transfer system according to claim 21 wherein said relay circuits comprise means for operating only one of said relay circuits at a time.

23. An information transfer system comprising a plurality of offices, a register circuit at each of said offices having individual devices for storing information, a maintenance center, signaling circuits extending between each of said offices and said center and each comprising: a two-conductor trunk having a first termination at said office and a second termination at said center; a pair of composite circuits, each of which is connected to one of said terminations for providing an alternating-current signaling path; and a pair of resistance hybrid circuits, each of which has a first termination connected to said alternating-current signaling path of one of said composite circuits, a second termination for transmitting signals to said last-mentioned path and a third termination for receiving signals from said last-mentioned path, pulse generating means at said center, means for applying pulses from said generating means to said second hybrid termination at said center, means at said offices responsive to the receipt of pulses from said third hybrid termination at said offices for reading said information from said devices, means for transmitting read information over said signaling circuits to said center and comprising means for applying a carrier frequency signal to said second hybrid termination at said offices and means for shifting the frequency of said carrier signal in accordance with said read information, storage means at said center having a plurality of storage areas each of which corresponds to one of said devices at each of said offices, means responsive to said pulses for selectively activating each of said areas, and means at said center responsive to the receipt of said carrier signal from said third hybrid terminations at said center for modulating said activating means.

24. An information transfer system comprising a plurality of offices, a register circuit at each of said offices having individual devices for storing information, a maintenance center, signaling circuits extending between each of said offices and said center and each of said signaling circuits comprising: a two-conductor trunk having a first termination at said office and a second termination at said center; a pair of composite circuits, each of which is connected to one of said terminations for providing an alternating current signaling path and a direct-current signaling path over said trunk; and a pair of resistance hybrid circuits, each of which has a first termination connected to said alternating-current signaling path of one of said composite circuits, a second termination for transmitting signals to said last-mentioned path and a third termination for receiving signals from said last-mentioned path, pulse generating means at said center, means for applying pulses from said generating means to said signaling circuits and comprising a plurality of relay circuits, each of which is connectable to said direct-current signaling path of one of said signaling circuits and is operable for applying said pulses to said second hybrid termination of said one signaling circuit at said center and means for operating only one of said relay circuits at a time, a plurality of capacitors each selectively connectable to said generating means for determining the frequency of said generated pulses, means including a contact of each of said relays for connecting one of said capacitors to said generating means, means at said offices responsive to the receipt of said pulses from said third hybrid terminations at said offices for reading said information from said devices, means for transmitting read information over said second hybrid terminations at said offices to said center, storage means at said center having a plurality of storage areas, each of which corresponds to one of said devices at each of said offices, means responsive to said pulses for selectively activating each of said areas, and means at said center responsive to the receipt of said received information from said third hybrid terminations at said center for modulating said activating means.

References Cited by the Examiner
UNITED STATES PATENTS

| | | | |
|---|---|---|---|
| 2,275,017 | 3/42 | McNaney | 340—324.1 XR |
| 2,581,056 | 1/52 | Walmsley et al. | 340—163 |
| 2,594,731 | 4/52 | Connolly | 340—324.1 |
| 2,717,370 | 9/55 | Piper | 340—151 |
| 2,864,943 | 12/58 | Schultz | 340—151 X |
| 2,886,643 | 5/59 | Harris | 340—151 |
| 2,903,675 | 9/59 | Downey et al. | 340—287 XR |
| 2,951,234 | 8/60 | Spielberg et al. | 340—152 X |
| 2,965,884 | 12/60 | Henderson | 340—324.1 X |
| 2,985,871 | 5/61 | Bemis | 340—287 XR |
| 3,098,215 | 7/63 | Waite | 340—151 |
| 3,122,723 | 2/64 | Coley et al. | 340—163 |
| 3,130,397 | 4/64 | Simmons | 340—324.1 |

NEIL C. READ, *Primary Examiner.*

E. JAMES SAX, *Examiner.*